UNITED STATES PATENT OFFICE.

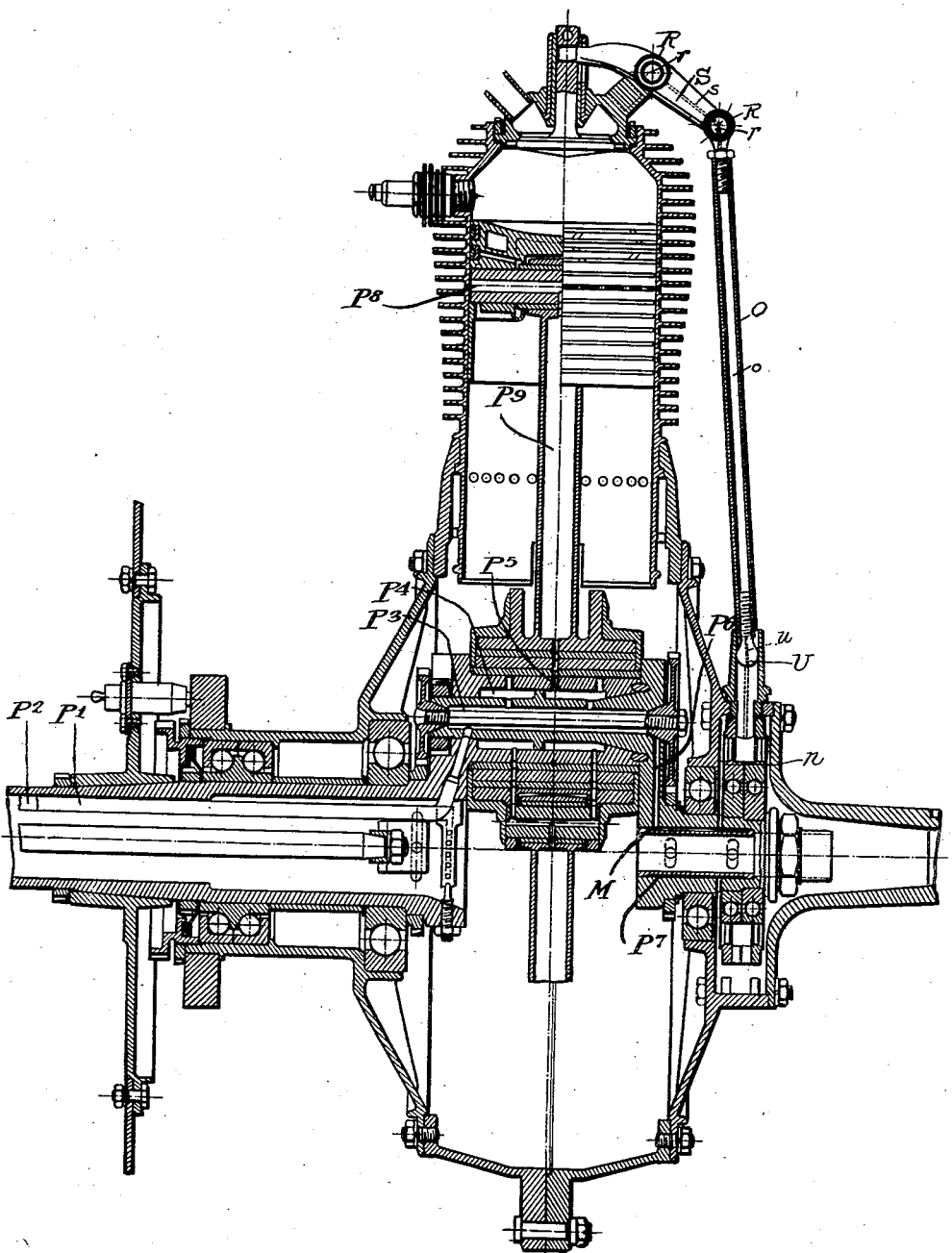

BATEMAN DAVID SCOTT, OF SALE, ENGLAND, ASSIGNOR TO THE GRESHAM FINANCE CORPORATION LIMITED, OF LONDON, ENGLAND, A CORPORATION OF GREAT BRITAIN.

LUBRICATION OF RADIAL-CYLINDER ENGINES.

1,321,338.  Specification of Letters Patent.  Patented Nov. 11, 1919.

Application filed March 27, 1916. Serial No. 87,027.

*To all whom it may concern:*

Be it known that I, BATEMAN DAVID SCOTT, a subject of the King of Great Britain, and a resident of Hereford Cottage, Sale, Cheshire, England, have invented new and useful Improvements in the Lubrication of Radial-Cylinder Engines, of which the following is the specification.

This invention relates to the lubrication of radial cylinder engines.

The object of this invention is to provide improved means for lubricating the big ends of the connecting rods, the main bearings of the shaft, and the gudgeon pin, such lubrication being conveyed through the hollow crank pin.

The appended drawing is a section through the crank shaft, crank case and one cylinder of a revolving cylinder engine illustrating my invention as applied to such an engine.

Lubrication is effected by means of adjustable sight feeds from which the oil is drawn by means of a pump or pumps adjustable for pressure and forced through pipes and passages to the bearings, connecting rods, small ends and cylinder walls. Great economy in consumption of lubricant results from the arrangement. Two small pipes P¹ and P², one behind the other pass along the crank shaft, one for oil, and the other for petrol, which are fed respectively by separate pumps not shown. P¹ is the pipe for lubricating oil which delivers to the annular space P³, and thence by the annular space P⁴, thence by the registering channels P⁵ into the connecting rods, from whence it is caused to pass by the channel P⁸ in the gudgeon pin to the cylinder walls. From the annular recess P³ the oil also passes by means of the channel P⁶ to the recess P⁷ in the sleeve M. From this recess P⁷ the oil is further forced through the hole $m$ to the hollow portions $n$ of the tappet valve gear, and from whence the flow of oil continues through the tappet rods proper O, the same being hollow as designated by $o$, and the rocker bearings $u$ of which are channeled, to allow the oil being forced therethrough. The flow of lubricant then continues through the pins R and rocker arm S by means of passages $r$ and $s$. Therefore it will be seen that not only lubrication is insured throughout the crank arm, crank pin, connecting rod and gudgeon pin to the wall of the cylinder, but also the entire valve operating mechanism is assured of lubrication.

What I do claim as my invention and desire to secure by Letters Patent is:—

1. A lubricating system for motors including a crank shaft having a hollow crank pin, valve gears at one end of the crank shaft comprising operating wheels, eccentrics, tappet rods, rockers and pins, a conduit for conveying lubricant to the interior of the hollow crank pin, a conduit leading therefrom through the crank shaft to the valve gear, the tappet rods of the valve gear being formed hollow to provide oil passages leading to the rockers and pins of the valve gear, substantially as described.

2. A lubricating system for motors including a crank shaft having a hollow crank pin, channeled valve gears at one end of the crank shaft, a channeled sleeve within the crank shaft adjacent the valve gears, an opening through said sleeve, the channeled valve gears comprising hollow tappet rods, channeled rocker arms and channeled pins, a conduit for conveying lubricant to the interior of the hollow crank shaft, and a conduit leading therefrom through the sleeve, the channeled portions of the valve gear, including the hollow tappet arms, channeled rocker arms and pins.

BATEMAN DAVID SCOTT.

Witnesses:
ERNALD SIMPSON MOSELEY,
MALCOLM SMETHURST.